(12) United States Patent
Schacher et al.

(10) Patent No.: US 11,326,012 B2
(45) Date of Patent: May 10, 2022

(54) COMPOSITION FOR PRODUCING A POLYMER, A METHOD FOR PRODUCING THE POLYMER, SAID POLYMER, USE OF THE POLYMER, AND AN ELECTRICALLY DIMMABLE GLAZING ENCLOSING THE POLYMER

(71) Applicant: Friedrich-Schiller-Universitaet Jena, Jena (DE)

(72) Inventors: Felix Helmut Schacher, Jena (DE); Oliver Eckardt, Jena (DE); Axel H. E. Mueller, Wiesbaden (DE); Sven Breuermann, Plauen (DE); Dirk Joedicke, Plauen (DE)

(73) Assignee: FRIEDRICH-SCHILLER-UNIVERSITAET JENA, Jena (DE)

( * ) Notice: Subject to any disclaimer, the term of this patent is extended or adjusted under 35 U.S.C. 154(b) by 258 days.

(21) Appl. No.: 16/489,813

(22) PCT Filed: Mar. 2, 2018

(86) PCT No.: PCT/DE2018/100190
§ 371 (c)(1),
(2) Date: Aug. 29, 2019

(87) PCT Pub. No.: WO2018/157891
PCT Pub. Date: Sep. 7, 2018

(65) Prior Publication Data
US 2019/0385762 A1 Dec. 19, 2019

(30) Foreign Application Priority Data
Mar. 3, 2017 (EP) .................................. 17159204

(51) Int. Cl.
| C08F 265/06 | (2006.01) |
| C08F 212/08 | (2006.01) |
| C08J 5/18 | (2006.01) |
| E06B 9/24 | (2006.01) |
| G02F 1/15 | (2019.01) |
| G02F 1/1523 | (2019.01) |
| H01B 1/12 | (2006.01) |
| C08F 220/18 | (2006.01) |

(52) U.S. Cl.
CPC .......... *C08F 265/06* (2013.01); *C08F 212/08* (2013.01); *C08F 220/1804* (2020.02); *C08F 220/1808* (2020.02); *C08J 5/18* (2013.01); *E06B 9/24* (2013.01); *G02F 1/1525* (2013.01); *H01B 1/122* (2013.01); *C08F 220/1806* (2020.02); *C08F 2800/20* (2013.01); *C08J 2325/10* (2013.01); *C08J 2333/10* (2013.01); *E06B 2009/2464* (2013.01)

(58) Field of Classification Search
CPC .... C08F 265/06; C08F 212/08; C08F 220/18; C08F 220/1804; C08F 220/1806; C08F 2800/20; C08J 5/18; C08J 2325/10; C08J 2333/10; E06B 9/24; E06B 2009/2464; C02F 1/1525; H01B 1/122
USPC ............................................................ 526/75
See application file for complete search history.

(56) References Cited

U.S. PATENT DOCUMENTS

| 5,241,411 A | 8/1993 | Arribart |
| 5,379,146 A | 1/1995 | Vitrage |
| 5,501,919 A | 3/1996 | Paul |
| 6,767,624 B2 | 7/2004 | Bronstert |
| 7,438,830 B2 | 10/2008 | Schmitt |
| 7,916,379 B2 | 3/2011 | Jodicke |
| 8,188,182 B2 | 5/2012 | Stenzel |
| 8,952,096 B2 | 2/2015 | Bauers |
| 2012/0157551 A1* | 6/2012 | Findlay ................. C08F 212/08 514/772.6 |

FOREIGN PATENT DOCUMENTS

| CN | 103760713 B | 4/2016 | |
| DE | 4417219 A1 | 12/1995 | |
| DE | 69213833 T2 | 4/1997 | |
| DE | 69528148 T2 | 1/2003 | |
| DE | 10327517 A1 | 1/2005 | |
| DE | 102008054482 A1 | 6/2010 | |
| EP | 0683215 A1 * | 11/1995 | .......... G02F 1/1525 |
| EP | 1283436 A2 | 2/2003 | |
| EP | 2093270 A1 | 8/2009 | |
| FR | 2690536 A1 | 10/1993 | |
| WO | 240578 A1 | 5/2002 | |
| WO | 2005085308 A1 | 9/2005 | |
| WO | 2017036734 A1 | 3/2017 | |

OTHER PUBLICATIONS

International Search Report with regard to International Application No. PCT/DE2018/100190, dated Jun. 8, 2018.
S. Loshaek, T. G. Fox, J. Am. Chem. Soc. 1953, 75, 3544-3550.
F. S. Nichols, R. G. Flowers, Ind. Eng. Chem. 1950, 42, 292-295.
Versluis A., Douglas W. H., Cross M., S. R. L., J Dent Res 1996, 75, 871-878.
Bailey William J., E. Takeshi, Journal of Polymer Science: Polymer Symposium 1978, 64, 17-26.
N. O'Brien, A. McKee, D. C. Sherrington, A. T. Slark, A. Titterton, Polymer 2000, 41, 6027-6031.
S. B. Kharchenko, R. M. Kannan, J. J. Cernohous, Macromolecules 2003, 36, 399-406.

* cited by examiner

*Primary Examiner* — Michael M. Bernshteyn
(74) *Attorney, Agent, or Firm* — Abel Schillinger, LLP

(57) ABSTRACT

The present invention relates to a composition for producing a polymer, comprising: a) from 20 to 60% by weight, based on the entire composition, of at least one monomer; and b) from 30 to 60% by weight, based on the entire composition, of at least one branched pre-polymer, wherein the composition is liquid at room temperature and under normal pressure; use of the composition, a method for producing a polymer using the composition, as well as an electrically dimmable glazing that encloses the polymer.

18 Claims, 1 Drawing Sheet

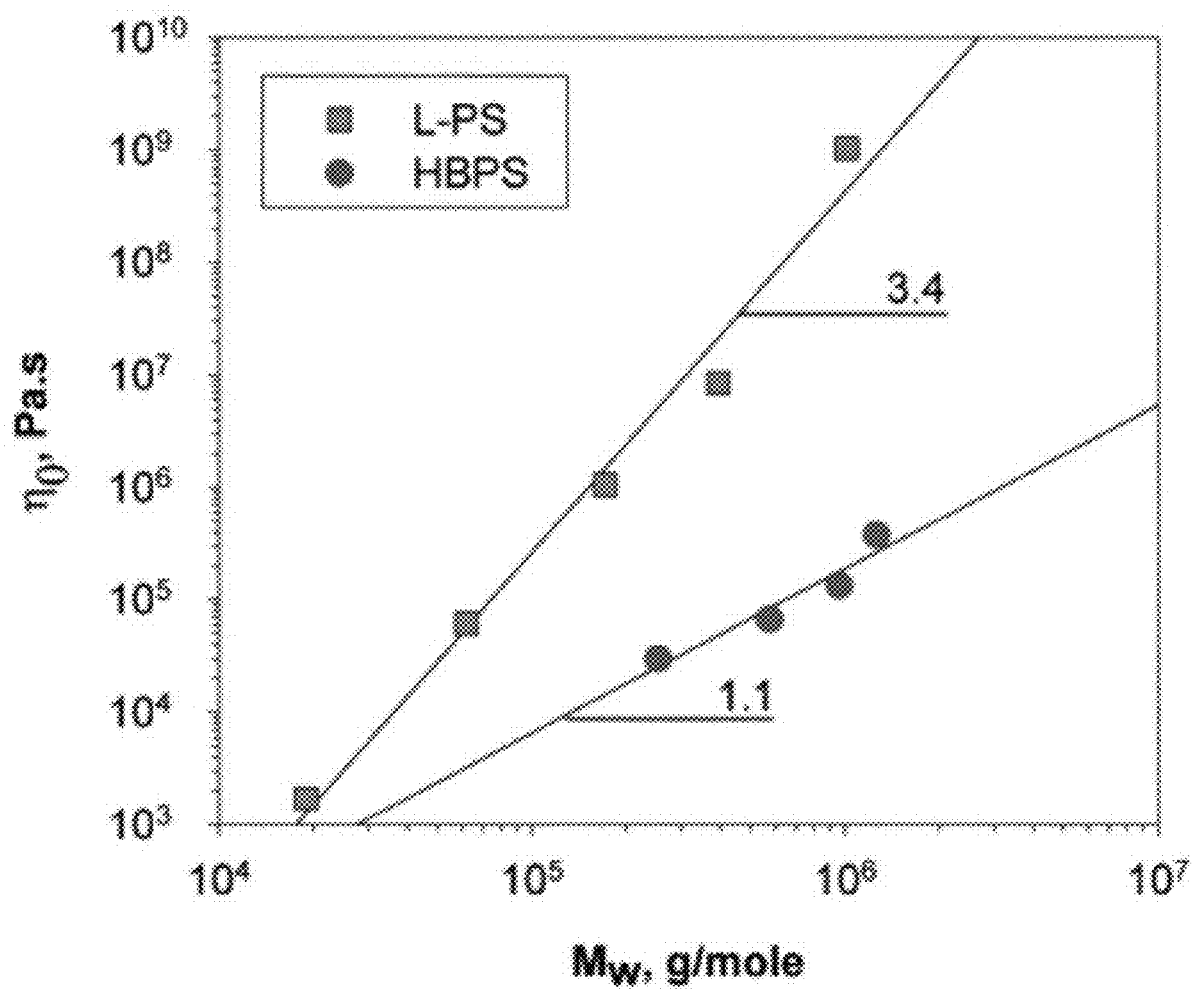

COMPOSITION FOR PRODUCING A POLYMER, A METHOD FOR PRODUCING THE POLYMER, SAID POLYMER, USE OF THE POLYMER, AND AN ELECTRICALLY DIMMABLE GLAZING ENCLOSING THE POLYMER

The present invention relates to a composition for producing a polymer, a method for producing the polymer using the composition, said polymer, the use of the polymer, and an electrically dimmable glazing that encloses the polymer The curing of monomers and their mixtures (polymerization) is generally associated with a volume contraction or an increase in material density. These changes increasingly lead to stresses in the material and, especially in the case of laminated glass, can result in end products with defects or areas of inadequate adhesion. In order to solve this problem, the polymerization shrinkage during curing must be reduced.

By way of example, the following table lists literature data on the volume shrinkage of a few selected typical monomers.

| Monomer | Volume shrinkage [%] |
| --- | --- |
| Methyl methacrylate[1] | 23% |
| Ethyl methacrylate[1] | 22% |
| n-Propyl methacrylate[1] | 21% |
| n-Butyl methacrylate[1] | 23% |
| Isobutyl methacrylate[1] | 21% |
| Methylacrylate[1] | 23% |
| Ethyl acrylate[1] | 21% |
| Vinyl chloride[2] | 34% |
| Acrylonitrile[2] | 31% |
| Vinyl acetate[2] | 21% |
| Styrene[2] | 15% |

One common method for reducing shrinkage is to introduce fillers, such as silica ($SiO_2$) particles[3] The filler volume limits the shrinkage during the polymerization. However, this method alters the physical properties of the resulting polymer, such as hardness and flexibility. Likewise, the viscosity of the mixture increases unfavorably. Furthermore, the addition of coarse-grained fillers increases the wear of the production machines, resulting in an increase in production costs.

Thus, the shrinkage can be reduced by addition of silica particles to 2.2 to 8.8%[3].

According to the prior art, an alternative method of reducing shrinkage is to add pre-polymers to the monomer mixture. Pre-polymers consist largely of linear oligomers or polymers of the monomer to be cured, which can increase the density of the monomer mixture and thus reduce shrinkage after polymerization. The greater the proportion of pre-polymer selected, the less the shrinkage. However, as the molecular weight of the pre-polymer increases, the viscosity of the monomer mixture also increases unfavorably. This leads to problems in the transport of the mixture and, in extreme cases, can lead to gelation, severely limited processability, and, in extreme cases, to damage of production facilities. The resulting high and thus disadvantageous viscosity of the pre-polymers make it ultimately impossible in practice to use a pre-polymerizate with the usual filling methods used on an industrial scale. Thus, for example, a high-viscosity resin can no longer be pumped through small cannulas in the space between two glass plates.

Another method, which is often used to reduce the polymer shrinkage according to the prior art, is the use of so-called "expanding monomers."[4] These often consist of ring systems which are processed by ring-opening polymerization. The advantage of this method is that the resulting polymer chains have a larger volume than the monomers, which in theory results in a positive shrinkage (expansion) of the cured polymer. However, this requires special monomers, which have to be individually adapted to the field of application and thus can be obtained only with difficulty. The method of "expanding monomers" is therefore not a widely used method and it is tied to the chemical properties of the monomers and the resulting polymers. Polyacrylates and polystyrene cannot be prepared by the above methodology.

Another approach for reducing the shrinkage of a monomer mixture between 2 glass sheets consists of partially curing the monomer mixture. After short-term curing, a cast resin mixture was injected repeatedly between the glass sheets and then completely cured. This method reduces the stresses in the material and prevents the film from detaching from the glass surface. In this case, however, there is a significant added expense since this partial curing cannot be automated and involves high costs.

In view of the problems known from the prior art, it is the object of the present invention to provide a composition for producing a polymer which overcomes the disadvantages of the prior art, in particular has a reduced reduction of the volume (=shrinkage, or polymerization shrinkage or volume shrinkage) with as constant as possible low viscosity during the transition from a liquid monomer mixture (=composition) to the cured polymer (=polymer). It is also intended to provide a composition for making a polymer, wherein the properties of the polymer do not change significantly during curing (polymerizing).

It is also the object of the present invention to provide a polymer which overcomes the disadvantages of the prior art. It is also intended to provide a method of producing the polymer as well as products comprising the polymer which overcome the disadvantages of the prior art.

This object is achieved by a composition for producing a polymer comprising: a) from 20 to 60% by weight, based on the entire composition, of at least one monomer; and b) from 30 to 60% by weight, based on the entire composition, of at least one branched pre-polymer, wherein the composition is liquid at room temperature and under normal pressure.

For the purposes of the invention, a polymer is a chemical substance which consists of macromolecules. The macromolecules of the polymer are composed of several (or many) structural units called monomers, which are connected to each other by covalent bonding.

For the purposes of the invention, a monomer is a low molecular weight, reactive molecule which is suitable for the construction of a polymer by combination with other monomers. According to the invention, unless otherwise stated in the application, a monomer has at least one functional group. A functional group here is a group that allows the polymerization of the monomer. Particularly preferred here is a $C=C$ double bond as a functional group, by which a radical chain polymerization is made possible. By way of example, the $C=C$ double bond of a vinyl group or the corresponding $C=C$ double bond of an (alkyl) acrylate group may be mentioned in this connection.

For the purposes of the invention, the term pre-polymer denotes a reactive oligomer which is used to prepare polymers. In one embodiment, it may be provided that the pre-polymer is a branched pre-polymer. The branched pre-polymer comprises at least one, preferably several, side chain(s). In a further embodiment it can be provided that the monomers and pre-polymers contained in the composition according to the invention are radically polymerizable, that is, they comprise radically polymerizable units. In other words, it can be provided that the composition according to the invention is one for producing a polymer by means of radical polymerization. It can be provided that the composition is used for the preparation of polyacrylates, polymethacrylates, polystyrenes, or copolymers thereof.

For the purposes of the invention, the term room temperature denotes a temperature of 20° C. The term normal pressure refers to a pressure of 1.01325 bar.

According to the invention, it may further be provided that the composition according to the invention comprises further constituents, for example a polymerization initiator, for example Ergacure 819, a solvent, for example propylene carbonate, or further additives, for example lithium perchlorate.

In addition, it can be provided that the composition according to the invention contains radically polymerizable crosslinkers, for example diacrylates, triacrylates, tetraacrylates, or similar compounds.

According to the invention, it is provided that the constituents contained in the composition according to the invention add up to a total amount of 100%.

It is preferably provided that the monomer is contained in an amount of 25 to 55% by weight, particularly preferably 29 to 50% by weight, based on the entire composition, in the composition. It is likewise preferable that the branched pre-polymer is contained in the composition in an amount of 35 to 55% by weight, more preferably 35 to 50% by weight, based on the entire composition. The use of the preferred amount (s) of monomer and/or pre-polymer results in a particularly low viscosity.

It is likewise preferable that the branched pre-polymer has a number average molecular weight Mn of 1,000 to 10,000 g/mol, preferably 1,500 to 8,000 g/mol.

In addition, it is preferable that the branched pre-polymer has a weight average molecular weight Mw of 2,000 to 40,000 g/mol, preferably 4,000 to 30,000 g/mol.

It is also preferred that the pre-polymer has a dispersity of from 2 to 10, preferably from 2.5 to 8. The term dispersity here describes the ratio of weight average of the molecular weight to the number average of the molecular weight.

Due to the preferred choice of the number average molecular weight and/or the weight average molecular weight and/or the dispersity of the branched pre-polymer, a particularly low shrinkage could be achieved. The lowest shrinkage could be achieved by combining the preferred features.

It can likewise be provided that the pre-polymer has a degree of branching of 0.4 to 0.7, in another embodiment, from 0.5 to 0.6.

Both the number average molecular weight and the weight average molecular weight were determined by size exclusion chromatography (SEC). For the SEC measurements, an Agilent 1200 system with a G1310A pump, a G1362A refractive index detector, and PSS Gram30 and PSS Gram1000 columns connected in series, with a separability of 374-1.040.000 Da was used. The solvent used was a mixture of N, N-dimethylacetamide (DMAc) and 5 mmol of LiCl. The flow rate was 1 mL min-1 and the column oven was set at a temperature of 40° C. The system was calibrated with polymethyl methacrylate and polystyrene standards.

Further, the composition of the present invention and the polymer prepared based on the composition were characterized by nuclear magnetic resonance (NMR) spectroscopy. For all 1H NMR spectra recorded, a 300 MHz Bruker Fourier300 Avance spectrometer was used at room temperature. The chemical shift (in ppm, parts per million) was shown based on the solvent signal. The solvent used was deuterated chloroform, tetrahydrofuran (THF) and dimethyl sulfoxide (DMSO) from the company Deutero.

In addition, it is preferred that the monomer is selected from the group, consisting of methyl methacrylate, ethyl methacrylate, n-propyl methacrylate, n-butyl methacrylate, isobutyl methacrylate, methyl acrylate, ethyl acrylate, vinyl chloride, acrylonitrile, vinyl acetate, styrene, 2-ethylhexyl acrylate, hydroxyethyl acrylate, N-Isopropyl acrylamide, N, N-dimethylaminoethyl methacrylate, N,N-dimethylaminoethyl acrylate, 2-vinylpyridine, 4-vinylpyridine or mixtures thereof, preferably n-butyl acrylate and/or 2-ethylhexyl acrylate and/or 2-hydroxyethyl acrylate and/or styrene. For the preferred monomers, a particularly advantageous relationship between low shrinkage and low viscosity could be observed.

Moreover, it is preferred that the branched pre-polymer is a branched poly(alkyl)acrylate, preferably branched poly-n-butyl acrylate, branched poly-2-ethylhexyl acrylate, branched poly(n-butyl acrylate-co-2-ethylhexyl acrylate), or mixtures thereof, branched polyacrylate, branched polystyrene, or a mixture thereof. By choosing the pre-polymers described as preferred, low shrinkage properties could be observed with simultaneously low viscosity.

In a further embodiment, it can be provided that the pre-polymers according to the invention are those pre-polymers which can be prepared from the monomers mentioned above as being preferred (and/or similar monomers).

It is preferred that the composition further comprises c) from 0.1 to 2% by weight, based on the total composition, of a further monomer having at least two polymerizable groups. By adding such a further monomer, which comprises a plurality of functional groups, that is to say groups which allow polymerization, the degree of branching of the polymer could be increased and therefore the curing of the polymer could be increased. In this preferred embodiment, in which another monomer, having a plurality of functional groups, is contained in the composition, it may be preferable provided that the monomer, contained in an amount of from 20 to 60% by weight, based on the entire composition in which the composition, has exactly one functional group.

It is further preferred that the pre-polymer is obtainable by reacting (a) at least one monomer having a polymerizable group; (b) at least one monomer having at least two polymerizable groups; and (c) at least one chain transfer agent.

In this context, it is preferable that reacting the monomer having a polymerizable group, the monomer having at least two polymerizable groups, and the chain transfer agent is carried out in the presence of a polymerization initiator.

Particularly preferred here is that the monomer having a polymerizable group (a), the monomer having at least two polymerizable groups (b) and the chain transfer agent (c) are present in a ratio of (a)=1 to 100, preferably (a)=2 to 70/(b)=1/(c)=0.1 to 10, preferably (c)=0.5 to 6. The ratio here refers to the substance amounts. The (substance amount) ratio a/b/c is therefore preferably 1-100/1/0.1-10.

It can be provided according to the invention that reacting the reagents for producing the pre-polymer takes place in the presence of further constituents, for example in the presence of a solvent of a polymerization initiator, for example Irgacure 819, etc.

Irgacure 819 here describes the mixture of the corresponding trade name marketed on the filing date.

A chain transfer agent according to the invention is a compound which has at least one weak bond, by means of which a chain transfer reaction is facilitated. Chain transfer agents preferred according to the invention are aliphatic thiols and/or aromatic thiols. Particularly preferred here is the use of dodecanethiol as a chain transfer agent.

The described preferred preparation of the pre-polymer describes the so-called "Strathclyde" method. Here, monomers having a functional group (such as divinyl monomers) and monomers having two (or more) functional groups (such as divinyl monomers) are reacted in the presence of a chain transfer agent. By adding an amount of the chain transfer agent, the length of the primary polymer chain can be controlled. As a result, complete curing of the mixture is prevented.

The object underlying the invention is further achieved by the use of the composition according to the invention for producing a dental composite, for producing a glass ionomer cement, for producing a low-shrink acrylate adhesive, for producing a low-shrink acrylic glass sheet, for producing a precisely fitting acrylic materials, in electrical engineering, or for producing a glass-polymer-glass composite pane, preferably by means of cast resin technology.

Further, the object underlying the invention is achieved by a method for producing a polymer, the method comprising:
a) providing a composition according to the invention; and
b) reacting the monomer and the pre-polymer.

In this case, it can be provided according to the invention that the reaction of monomer and pre-polymer takes place in the presence of further constituents, for example a solvent, of a polymerization initiator, for example Ergacure 819, etc.

Finally, the object underlying the invention is achieved by an electrically dimmable glazing, comprising a polymer obtainable by the process according to the invention.

Electrically dimmable glazings are suitable for regulating and controlling the flow of energy from the outside into a building. Here, an electrical pulse, for example in the form of a suitable voltage, is used to change the glazing in its photometric properties, for example, lowering the light transmission from high values (e.g. 60%) to low values (e.g. 10%) (=coloring) during strong irradiance and increasing the light transmission from low values (for example 10%) to high levels (for example 60%) (=decolorization) during weak irradiance.

An electrochromic element, which is used for production in an electrically dimmable glazing, usually consists of two transparent tabular materials (glass or plastic, e.g. Plexiglas or polycarbonate), which are bonded (glued) to each other via an ion-conductive film. Between the ion-conductive film and the adjacent surfaces of the transparent panels, there are conductive (TCO=transparent conductive oxides) and electrochromic coatings (EC 1 and EC 2) in the following arrangement:

glass-TCO-EC 1-ion-conductive film-EC 2-TCO-Glass

Materials for conductive transparent coatings (TCOs) may be the known systems: fluorine doped tin oxide (e.g. PILKINGTON K-GlasN or PILKINGTON TEC glass), ITO (indium tin oxide), ATO (antimony tin oxide), or others (e.g. B. aluminum doped zinc oxide).

Materials for the electrochromic coating (EC 1) may be: tungsten oxide, molybdenum oxide, nickel oxide, iridium oxide, or mixtures of said metal oxides.

Materials for the electrochromic coating (EC 2) may be: cerium oxide, titanium oxide, vanadium oxide, niobium oxide, tantalum oxide, or mixtures of said metal oxides.

The core of such a reversibly switchable electrochromic element is an ion-conductive polymer, which is located between the two coated panels and thus permanently bonds them. The ion-conductive polymer additionally has the function of providing charge carriers in order to transport charge carriers from one electrochromic coating (e.g. EC1) to the other electrochromic coating (e.g.EC2) by means of an electrical voltage pulse. Suitable charge carriers can be lithium ions and hydrogen ions.

Such an ion-conductive polymer is not available on the market as a film. For the preparation of an electrochromic element therefore, starting from a prepared mixture of all necessary components—the so-called monomer mixture—it is cast between two prepared glass plates and then cured by UV radiation. During hardening, i.e. from the transition of the low-viscosity liquid phase of the monomer mixture to the solid polymer phase, the material shrinks. This volume shrinkage is considerable at around 12% and leads to mechanical stresses in the glass-polymer-glass composite system, which can affect the corners and edges of the laminate in particular. The mechanical stresses can lead to mechanical detachments and thus to restrictions in use under stress of the window elements (temperature fluctuations over the course of the day and the year). According to previous findings, the mechanical stresses are particularly strong in model disks (triangles, pentagons, trapeziums, etc.) with corner angles smaller than 90°.

Ion-conductive films can be prepared based on modified polyvinyl butyral, polyethylene oxides, polyethyleneimines, or polyacrylates. Modified polyvinyl butyral films are sufficiently described in patents DE 103 27 517 and WO 02/40578 of GESIMAT Co., for example; modified polyethylene oxide or polyethyleneimines are sufficiently described in patents FR 2690536, U.S. Pat. No. 5,241,411 and DE 69213833 of the Saint-Gobain Co. Acrylates and other polymers are known from EP 1 283 436 of BASF AG as well as DE 695 28 148 and DE 44 17 219 of FLACHGLAS AG/FLABEG/EControl glass and EP 2093 270 of EControl glass. Ion-conductive films are often referred to in the literature as polymeric ionic conductors. Both names ("ion-conductive film" and "polymeric ionic conductor") are equivalent and synonymous.

Example 1 according to the invention is an example of a polymeric ion conductor which is suitable for an ion-conductive film for the production of switchable glasses according to the abovementioned structure.

The present invention relates to the production and use of a resin which, on transition from the liquid monomer mixture to the cured polymer, has a significantly lower shrinkage than that mentioned in the prior art and at the same time has a low viscosity.

Also disclosed in this invention is a new type of filler (pre-polymer) which does not appreciably affect the properties of the polymer after curing, but significantly reduces polymer shrinkage without unfavorably increasing the viscosity.

Surprisingly, it has been found by the inventors that the use of the composition according to the invention causes the reduction of polymer shrinkage of a cast resin mixture during the curing process (polymerization). By adding branched pre-polymers, for example polyacrylates, which can be prepared by the "Strathclyde method" developed by Sherrington, the shrinkage of a cast resin mixture (monomer mixture) can be considerably reduced. It should be noted that the viscosity of the cast resin mixture increases only slightly compared to linear pre-polymers of comparable molecular weight.

The invention will be described in detail below on the basis of particularly preferred embodiments.

In order to reduce the polymer shrinkage of a polymer during curing (transition of the liquid low viscosity phase of the monomer mixture to the solid polymer phase), branched pre-polymers are added. These branched polymers are prepared by the "Strathclyde" method developed by Sherrington.[5] Here monomers with (meth)acrylic or vinyl groups and polyfunctionalized crosslinkers (also with (meth)acrylic or vinyl groups) are copolymerized. So as to prevent gelation, an aliphatic thiol ($R_4$—SH with $R_4$=aliphatic) or an aromatic thiol ($R_4$—SH mit $R_4$=aromatic) is added to the monomer mixture. By varying the components such as the thiol, for example, the molecular weight of the resulting branched polymer can be adjusted.

Diagram 1: Production of a branched polyacrylate by the Strathclyde method using the example of acrylates (with $R_2$ = H) und methacrylates (with $R_2$ = $CH_3$); Example 1 with $R_1$ = n-Bu =
—$CH_2$—$CH_2$—$CH_2$—$CH_3$

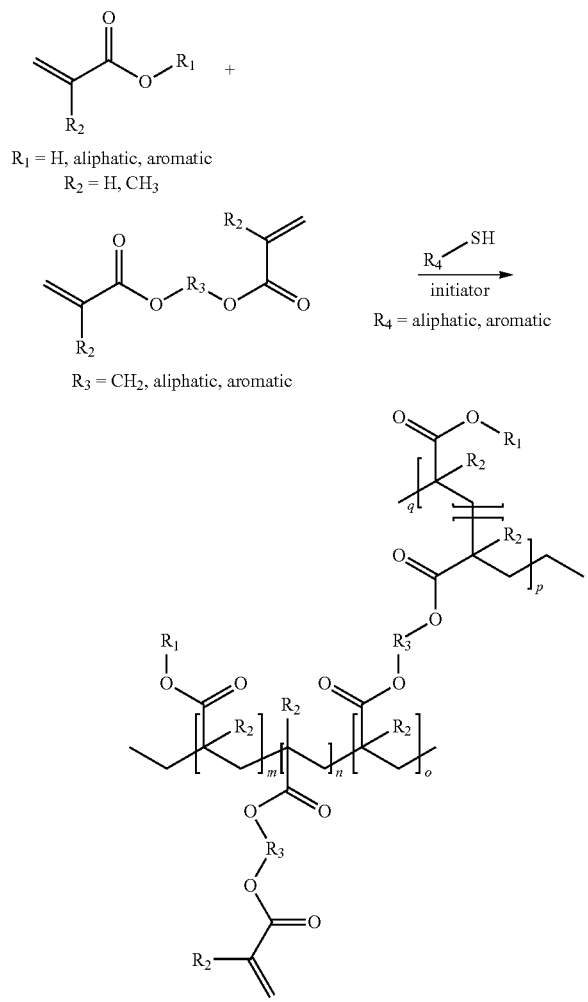

The branched polymers thus produced are now added as additives in the production of polymeric materials. If branched polymers are now used (prepared for example from n-butyl acrylate according to the Strathclyde method) in admixture with monomeric n-butyl acrylate, the volume shrinkage during polymerization can be lowered to 4%, while the volume shrinkage in pure n-butyl acrylate is about 11% (see Example 1).

Diagram 2: Preparation of a branched polyacrylate according to the Strathclyde method using the example of styrene

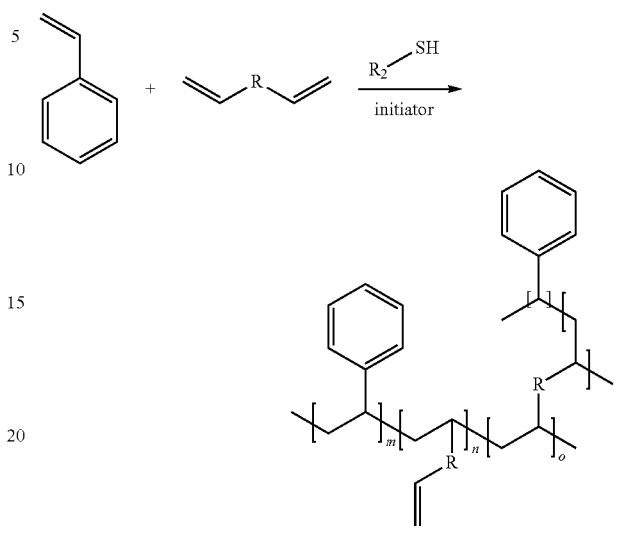

R = aliphatic, aromatic $R_2$ = aliphatic, aromatic

The viscosity of the monomer mixture is not increased as much when using branched polymers as compared with the use of linear pre-polymers. This is due to the form factor α. The viscosity of a polymer solution is described by the Mark-Houwink equation.

$$\eta = KM^a.$$

Here η describes the viscosity of the polymer solution, and M the molar mass of the dissolved polymer. K is a substance-specific factor, just as a is the polymer-specific form factor. For linear polymers this form factor is 0.72. Branched polymers, on the other hand, have a lower form factor, depending on the degree of branching. This leads to a reduction in the viscosity when adding branched polymers in contrast to linear polymers with the same molecular weight. Thus, the monomer mixture used also has a lower viscosity compared with the conventionally used linear pre-polymers.

An essential aspect of the invention is therefore the use of branched pre-polymers as additives in monomeric mixtures for the reduction of the polymer shrinkage, wherein, at the same time, by the use of the branched pre-polymers, only a slight increase in viscosity occurs, which allows the processing and flowability of the resin.

One meaningful example that might be mentioned is the smaller increase of linearly polymerized polystyrene compared with the branched polymerized styrene[6]. This is shown in FIG. 1. FIG. 1 shows the intrinsic viscosity as a function of the molar mass of the polymers. It is noticeable that the curve of the linear polystyrene increases more strongly in comparison to the branched polystyrene.

FIG. 1: Difference in the viscosity increase of linear and branched polystyrene as a function of the molar mass; (L-PS=linearly polymerized polystyrene, HBPS=branched polymerized polystyrene)

In summary, this invention has the following advantages: The volume shrinkage of a monomeric mixture during curing is significantly reduced.

The viscosity of the resin mixture remains low and can thus be used and pumped on an industrial scale.

The invention will be illustrated below in an exemplary manner with reference to specific examples. These examples are illustrative of the invention and do not limit the scope of the invention as recited.

EXEMPLARY EMBODIMENTS

The following exemplary embodiments are mentioned.

Examples 1-3: Preparation of a branched polyacrylate from a pure monomer, for example, n-butyl acrylate; preparation of a polymer film with the branched polyacrylate and the same monomeric acrylate Examples 4-6: Preparation of a branched polyacrylate from a pure monomer, for example, 2-ethylhexyl acrylate; preparation of a polymer film with the branched poly-2-ethylhexyl acrylate and another monomeric acrylate, for example n-butyl acrylate.

Examples 7-9: Preparation of a branched polyacrylate from a pure monomer for example, n-butyl acrylate; preparation of a film with the branched poly(n-butyl acrylate) or poly(ethyl hexyl acrylate) and a mixture of different monomeric acrylates, for example, n-butyl acrylate, 2-ethyl hexyl acrylate, 2-hydroxy ethyl acrylate.

Examples 10-11: Preparation of a branched acrylate copolymer from various monomers, e.g. n-butyl acrylate and 2-ethylhexyl acrylate; preparation of a film with the branched poly (n-butyl acrylate-co-2-ethyl hexyl acrylate) and another monomeric acrylate, for example n-butyl acrylate Examples 12-14: Preparation of a branched acrylate copolymer from various monomers, e.g. n-butyl acrylate and 2-ethylhexyl acrylate; preparation of a film with the branched poly(n-butyl acrylate-co-2-ethyl hexyl acrylate) and a mixture of different monomeric acrylates, for example, n-butyl acrylate, ethyl hexyl acrylate, 2-hydroxy ethyl acrylate.

Meanings are always the same:
nBA n-butylacrylate
EHA 2-ethylhexylacrylat
HEA hydroxyethyl acrylate
BDDA butanediol diacrylate
DDT dodecanethiol
TPGDA tripropylene glycol diacrylate
DVB divinyl benzene
THF tetrahydrofuran Example 1: Preparation of a Poly(n-Butyl Acrylate) (PnBA) Film The used branched PnBA was prepared as follows. 3 kg nBA were mixed with 117 g of tripropylene glycol diacrylate (TPGDA), 395 g of dodecanethiol (DDT), and 1.6 g of Irgacure 819. After 15 minutes of degassing/purging with argon, the mixture was irradiated for 20 minutes with a 100 W Hg UV lamp. The obtained branched polymer had a purity of 76% (nBA), a molecular weight distribution of $M_n$=1500 g/mol; Mw=4000 g/mol and a dispersity of 2.51.

For the preparation of an ion-conductive polymer film for use in an electrochromic element, a cast resin mixture of 29.05% nBA, 54.65% branched PnBA, 13.4% propylene carbonate, 1.50% lithium perchlorate (anhydride), 1% 1.4-Butane diol diacrylate and 0.4% Irgacure 819 was subsequently produced. This cast resin mixture had a viscosity of 9.6 mPas. After curing the film for 30 min under UV irradiation, a shrinkage of 4% could be determined. A similar mixture without addition of branched PnBA has a viscosity of 1.1 mPas and a shrinkage after complete curing of 11%.

Example 2: Preparation of a Poly(Ethyl Hexyl Acrylate) (PEHA) Film

The used branched PEHA was prepared as follows. 10 g EHA was mixed with 6.7 g tripropylene glycol diacrylate (TPGDA), 22.9 g dodecanethiol (DDT) and 95 mg Irgacure 819. After 15 minutes of degassing with argon, the mixture was irradiated for 20 minutes with a 100 W Hg UV lamp. The obtained branched polymer had a purity of 85% (15% unreacted EHA) and a molecular weight distribution of Mn=7600 g/mol; Mw=23200 g/mol, and a dispersity of 3. The obtained branched polymer had a purity of 85% (15% unreacted EHA) and a molecular weight distribution of $M_n$=7600 g/mol; $M_w$=23200 g/mol, and a dispersity of 3.

For the film preparation, a cast resin mixture of 49.4% EHA; 36.5% branched PEHA; 13.4% propylene carbonate, 0.3% butanediol diacrylate (BDDA), and 0.4% Irgacure 819 was subsequently produced. This cast resin mixture had a viscosity of 20 mPas. After curing the film for 30 min under UV irradiation, a shrinkage of 5% could be determined. A similar mixture without the addition of the branched PEHA has a viscosity of 2 mPas and a shrinkage after complete curing of 8%.

Example 3: Preparation of a Polystyrene (PS) Film

The used branched PS was produced as follows. 100 g of styrene with 2 g divinyl benzene (DVB), 16.2 g dodecanethiol (DDT), and 67 mg Irgacure 819 was dissolved in 50 mL of THF. After 15 minutes of degassing with argon, the mixture was irradiated for 20 minutes with a 100 W Hg UV lamp. The obtained branched polymer had a purity of 85% (15% unreacted EHA) and a molecular weight distribution of Mn=7600 g/mol; Mw=23200 g/mol, and a dispersity of 3. The obtained branched polymer had a purity of 81% (19% unreacted styrene) and a molecular weight distribution of $M_n$=3750 g/mol; $M_w$=29000 g/mol, and a dispersity of 7.8.

For the film preparation, a cast resin mixture of 35.9% styrene; 50% branched PS; 13.4% propylene carbonate, 0.3% divinyl benzene and 0.4% Irgacure 819 was subsequently produced. This cast resin mixture had a viscosity of 31 mPas. After curing the film for 30 min under UV irradiation, a shrinkage of 4% could be determined. A similar mixture without the addition of the branched PS has a viscosity of 2 mPas and a shrinkage after complete curing of 15%.

Example 4: Preparation of a Film from Mixtures

For film preparation, a cast resin mixture of 49.4% nBA; 36.5% branched PEHA; 13.4% propylene carbonate, 0.3% butanediol diacrylate, and 0.4% Irgacure 819 was produced This cast resin mixture had a viscosity of 18 mPas. After curing the film for 30 min under UV irradiation, a shrinkage of 6% could be determined. A similar mixture without the addition of the branched PEHA has a viscosity of 1.1 mPas and a shrinkage after complete curing of 11%.

Example 5: Preparation of a Film from Mixtures

For the film preparation, a cast resin mixture of 49.4% EHA; 36.5% branched PnBA; 13.4% propylene carbonate. 0.3% butanediol diacrylate, and 0.4% Irgacure 819 was produced. This cast resin mixture had a viscosity of 20 mPas. After curing the film for 30 min under UV irradiation, a shrinkage of 4% could be determined. A similar mixture without addition of branched PnBA has a viscosity of 2 mPas and a shrinkage after complete curing of 8%.

Example 6: Preparation of a Film from Mixtures

For film preparation, a casting resin mixture of 35.9% 2-hydroxyethylacrylate (HEA); 50% branched PnBA; 13.4% propylene carbonate, 0.3% 1,4-butanediol diacrylate, and 0.4% Irgacure 819 was produced. This cast resin mixture had a viscosity of 41 mPas. After curing the film for 30 min under UV irradiation, a shrinkage of 5% could be determined. A similar mixture without addition of branched PnBA has a viscosity of 6 mPas and a shrinkage after complete curing of 14%.

Example 7: Preparation of a Film from Mixtures

For the film preparation, a casting mixture of 30% nBA; 20% EHA; 35.9% branched PEHA; 13.4% propylene carbonate, 0.3% butanediol diacrylate, and 0.4% Irgacure 819 was produced. This cast resin mixture had a viscosity of 23 mPas. After curing the film for 30 min under UV irradiation, a shrinkage of 5% could be determined. A similar mixture without the addition of the branched PEHA has a viscosity of 1.8 mPas and a shrinkage after complete curing of 10%.

Example 8: Preparation of a Film from Mixtures

For the film preparation, a casting resin mixture of 30% nBA; 20% EHA; 35.9% branched PnBA; 13.4% propylene carbonate, 0.3% butanediol diacrylate, and 0.4% Irgacure 819 was produced. This cast resin mixture had a viscosity of 21 mPas. After curing the film for 30 min under UV irradiation, a shrinkage of 6% could be determined. A similar mixture without the addition of the branched PEHA has a viscosity of 1.3 mPas and a shrinkage after complete curing of 11%.

Example 9: Preparation of a Film from Mixtures

For the film preparation, a casting resin mixture of 20% nBA; 20% EHA; 10% 2-hydroxyethyl acrylate (HEA); 35.9% branched PnBA; 13.4% propylene carbonate, 0.3% butanediol diacrylate, and 0.4% Irgacure 819 was produced. This cast resin mixture had a viscosity of 32 mPas. After curing the film for 30 min under UV irradiation, a shrinkage of 7% could be determined. A similar mixture without addition of branched PnBA has a viscosity of 4.2 mPas and a shrinkage after complete curing of 13%.

Example 10: Preparation of a Film from Mixtures

The used branched copolymer (PnBA-co-PEHA) was produced as follows. 10 g nBA was mixed with 4.38 g EHA, 3.9 g tripropylene glycol diacrylate (TPGDA), 1.32 g dodecanethiol (DDT), and 5.4 mg Irgacure 819. After 15 minutes of degassing with argon, the mixture was irradiated for 20 minutes with a 100 W Hg UV lamp. The obtained branched polymer had a purity of 85% (15% unreacted EHA) and a molecular weight distribution of Mn=7600 g/mol; Mw=23200 g/mol, and a dispersity of 3. The obtained branched polymer had a purity of 81% (19% unreacted nBA and EHA) and a molecular weight distribution of $M_n$=2300 g/mol; $M_w$=6000 g/mol and dispersity of 2.6.

For the film preparation, a casting resin mixture of 50% 2-hydroxyethyl acrylate (HEA); 35.9% branched PnBA-co-PEHA; 13.4% propylene carbonate, 0.3% butanediol diacrylate, and 0.4% Irgacure 819 was produced. This cast resin mixture had a viscosity of 24 mPas. After curing the film for 30 min under UV irradiation, a shrinkage of 7% could be determined. A similar mixture without addition of the branched PnBA-co-PEHA has a viscosity of 6 mPas and a shrinkage after complete curing of 14%.

Example 11: Preparation of a Film from Mixtures

For the film preparation, a casting resin mixture of 50% nBA; 35.9% branched PnBA-co-PEHA; 13.4% propylene carbonate, 0.3% butanediol diacrylate, and 0.4% Irgacure 819 was produced. This cast resin mixture had a viscosity of 19 mPas. After curing the film for 30 min under UV irradiation, a shrinkage of 6% could be determined. A similar mixture without addition of the branched PnBA-co-PEHA has a viscosity of 1.1 mPas and a shrinkage after complete curing of 11%.

Example 12: Preparation of a Film from Mixtures

For the film preparation, a casting resin mixture of 30% nBA; 20% EHA; 35.9% branched PnBA-co-PEHA; 13.4% propylene carbonate, 0.3% butanediol diacrylate, and 0.4% Irgacure 819 was produced. This cast resin mixture had a viscosity of 21 mPas. After curing the film for 30 min under UV irradiation, a shrinkage of 5% could be determined. A similar mixture without addition of the branched PnBA-co-PEHA has a viscosity of 1.8 mPas and a shrinkage after complete curing of 10%.

Example 13: Preparation of a Film from Mixtures

For the film preparation, a casting resin mixture of 30% nBA; 20% EHA; 35.9% branched PEHA-co-PnBA; 13.4% propylene carbonate, 0.3% butanediol diacrylate, and 0.4% Irgacure 819 was produced. This cast resin mixture had a viscosity of 27 mPas. After curing the film for 30 min under UV irradiation, a shrinkage of 6% could be determined. A similar mixture without addition of the branched PEHA-co-PnBA has a viscosity of 1.8 mPas and a shrinkage after complete curing of 10%.

Example 14: Preparation of a Film from Mixtures

For the film preparation, a casting resin mixture of 20% nBA; 20% EHA; 10% 2-hydroxyethyl acrylate (HEA); 35.9% branched PEHA-co-PnBA; 13.4% propylene carbonate, 0.3% butanediol diacrylate, and 0.4% Irgacure 819 was produced. This cast resin mixture had a viscosity of 36 mPas. After curing the film for 30 min under UV irradiation, a shrinkage of 7% could be determined. A similar mixture without addition of the branched PEHA-co-PnBA has a viscosity of 4.2 mPas and a shrinkage after complete curing of 13%.

The invention can be used in all radical polymerizations in which the shrinkage during curing is to be reduced or avoided:

[1] S. Loshaek, T. G. Fox, J. Am. Chem. Soc. 1953, 75, 3544-3550.

[2] F. S. Nichols, R. G. Flowers, Ind. Eng. Chem. 1950, 42, 292-295.

[3] Versluis A., Douglas W. H., Cross M., S. R. L., J Dent Res 1996, 75, 871-878.

[4] Bailey William J., E. Takeshi, *Journal of Polymer Science: Polymer Symposium* 1978, 64, 17-26.
[5] N. O'Brien, A. McKee, D. C. Sherrington, A. T. Slark, A. Titterton, *Polymer* 2000, 41, 6027-6031.
[6] S. B. Kharchenko, R. M. Kannan, J. J. Cernohous, *Macromolecules* 2003, 36, 399-406.

The features disclosed in the specification and claims may be relevant to the realization of embodiments both individually and in any combination with each other.

The invention claimed is:

1. A composition for producing a polymer, comprising:
   20 to 60% by weight, based on the entire composition, of at least one monomer; and
   30 to 60% by weight, based on the entire composition, of at least one branched pre-polymer,
   wherein the composition is liquid at 20° C. and 1 bar;
   the at least one monomer is selected from the group consisting of methyl methacrylate, ethyl methacrylate, n-propyl methacrylate, n-butyl acrylate, n-butyl methacrylate, isobutyl methacrylate, methyl acrylate, ethyl acrylate, vinyl chloride, acrylonitrile, vinyl acetate, styrene, 2-ethylhexyl acrylate, 2-hydroxyethyl acrylate, N-Isopropyl acrylamide, N, N-dimethylaminoethyl methacrylate, N, N-dimethylaminoethyl acrylate, 2-vinylpyridine, 4-vinylpyridine, and any combination thereof; and
   the branched pre-polymer is a reaction product of a) at least one monomer having one polymerizable group, b) at least one monomer having at least two polymerizable groups, and c) at least one chain transfer agent.

2. The composition according to claim 1, wherein the at least one chain transfer agent includes an aliphatic thiol, an aromatic thiol, or a combination thereof.

3. The composition according to claim 1, wherein the branched pre-polymer has a number average of the molar mass $M_n$ of 1,000 to 10,000 g/mol.

4. The composition according to claim 1, wherein the branched pre-polymer has a weight average of the molar mass $M_w$ of 2,000 to 40,000 g/mol.

5. The composition according to claim 1, wherein the pre-polymer has a dispersity of 2 to 10.

6. The composition according to claim 5, wherein the branched pre-polymer has a dispersity of 2.5 to 8.

7. The composition of claim 1, wherein a viscosity of the composition is not greater than 41 mPas.

8. The composition according to claim 1, wherein the branched pre-polymer includes a branched poly(alkyl)acrylate, a branched polyacrylate, a branched polystyrene, or a combination thereof.

9. The composition according to claim 8, wherein the branched pre-polymer includes branched poly-n-butyl acrylate, branched poly-2-ethylhexyl acrylate, branched poly(n-butyl acrylate-co-2-ethylhexyl acrylate), or any combination thereof.

10. The composition according to claim 1, wherein the monomer of the composition includes n-butyl acrylate, 2-ethylhexyl acrylate, 2-hydroxyethyl acrylate, styrene, or any combination thereof.

11. The composition according to claim 1, wherein the composition comprises a further monomer having at least two polymerizable groups in an amount of 0.1 to 2% by weight based on the total weight of the composition.

12. The composition of claim 1, wherein the composition is adapted for producing a dental composite, a glass ionomer cement, an acrylate adhesive, an acrylic glass sheet, an acrylic material in electrical engineering, or a glass-polymer-glass composite pane.

13. An electrically dimmable glazing comprising the polymer of claim 1.

14. A method of producing a polymer, comprising:
    forming a branched pre-polymer, wherein forming the branched pre-polymer comprises reacting a) at least one monomer having one polymerizable group, b) at least one monomer having at least two polymerizable groups, and c) at least one chain transfer agent;
    preparing a composition comprising 30-60 wt % of the branched pre-polymer and 20-60 wt % of at least one monomer, the monomer being selected from the group consisting of methyl methacrylate, ethyl methacrylate, n-propyl methacrylate, n-butyl acrylate, n-butyl methacrylate, isobutyl methacrylate, methyl acrylate, ethyl acrylate, vinyl chloride, acrylonitrile, vinyl acetate, styrene, 2-ethylhexyl acrylate, 2-hydroxyethyl acrylate, N-Isopropyl acryl; and
    reacting the composition to form the polymer.

15. The method of claim 14, wherein a shrinkage of the composition after reacting the composition and forming the polymer is not greater than 7%.

16. The method of claim 14, wherein a viscosity of the composition is not greater than 41 mPas.

17. The method of claim 14, wherein a ratio for forming the branched pre-polymer of a) the at least one monomer having one polymerizable group to b) the at least one monomer having at least two polymerizable groups to c) the at least one chain transfer agent is 1-100/1/0.1-10.

18. The method according to claim 14, wherein the branched pre-polymer includes a branched poly(alkyl)acrylate, a branched polyacrylate, a branched polystyrene, or a combination thereof.

* * * * *